United States Patent [19]

Ciais et al.

[11] Patent Number: 4,584,064

[45] Date of Patent: Apr. 22, 1986

[54] DEVICE AND INSTALLATIONS FOR THE DISTILLATION BY THIN LAYER EVAPORATION PARTICULARLY OF HYDROCARBONS, AND PROCESS FOR OPERATING THIS DEVICE

[75] Inventors: André Ciais, Mornant; Gilles Variot, Villeurbanne, both of France

[73] Assignee: Elf France, Paris, France

[21] Appl. No.: 578,952

[22] Filed: Feb. 10, 1984

[30] Foreign Application Priority Data

Feb. 11, 1983 [FR] France ................... 83 02208

[51] Int. Cl.$^4$ ............................................. B01D 3/28
[52] U.S. Cl. .......................................... 203/89; 203/91; 202/236; 159/5; 159/22; 159/49; 165/118
[58] Field of Search ................... 203/89, 88, 91; 208/360; 202/236, 238; 159/14, 5, 22, 49; 165/118

[56] References Cited

U.S. PATENT DOCUMENTS

| 1,620,163 | 3/1927 | Milliff et al. | 208/360 |
| 2,525,025 | 10/1950 | Feil | 202/236 |
| 2,617,760 | 11/1952 | Burrows | 202/236 |
| 3,163,587 | 12/1964 | Champe | 202/236 |
| 3,241,598 | 3/1966 | Falkenblad et al. | 159/49 |
| 3,282,798 | 11/1966 | Tidball | 202/236 |
| 3,332,855 | 7/1967 | Watt | 202/236 |
| 3,412,777 | 11/1968 | Donnel et al. | 159/13 R |
| 3,507,752 | 4/1970 | Germerdonk | 202/236 |
| 4,167,454 | 9/1979 | Feres | 202/236 |
| 4,295,937 | 10/1981 | Mayer et al. | 202/236 |

FOREIGN PATENT DOCUMENTS 0546357 3/1977 U.S.S.R. ................... 202/236

OTHER PUBLICATIONS

Alfa-Laval, "Evaporation Plant Centritherm Model CT6", No. PD 60101E, Mar. 1973.

Primary Examiner—S. Leon Bashore
Assistant Examiner—V. Manoharan
Attorney, Agent, or Firm—Burgess, Ryan & Wayne

[57] ABSTRACT

The present invention concerns a process for the thin layer evaporation of liquid in which the thin layer to be evaporated is formed by centrifugation.

It is characterized in that the pointed part of the said cone is immersed in a reserve of liquid to be evaporated and a communication is established between the external face of the said pointed part of the cone and the internal face of this cone, so that the thin layer subjected to evaporation is formed on the internal face and on the external face of the cone.

It concerns a device and installation for the distillation by evaporation in thin layers, particularly for hydrocarbons, and process for operating this device.

9 Claims, 6 Drawing Figures

DEVICE AND INSTALLATIONS FOR THE DISTILLATION BY THIN LAYER EVAPORATION PARTICULARLY OF HYDROCARBONS, AND PROCESS FOR OPERATING THIS DEVICE

BACKGROUND OF THE INVENTION

The present invention concerns an evaporation process in thin layers, especially applicable to the dehydration of organic or mineral products, in particular heavy crude petroleums. This process can also be used for the purification of thermosensitive products, for the degassing of petroleum products issuing from cracking, for the separation of very stable emulsions.

The invention also concerns devices or installations allowing the operating of this process.

BRIEF DESCRIPTION OF THE PRIOR ART

Scraped or non scraped falling film apparatus, with axial or external condensation, are already known.

This apparatus does not allow, with reduced floor space, to obtain considerable outputs; exhaustion of the residue is only total for low distillate yield. For high yields, either feed is reduced, or the first partially concentrated residue must be pumped and sent to the feed in order to undergo a second evaporation.

Rotor apparatus called "centrifugal" apparatus are also known. This apparatus is the most often heated by means of electric resistances, which necessitates a constant circulation in product on its surface during the temperature conditioning phases. A single apparatus only allows recirculation of the residue by interruption of feed or by mixing with the feed.

BRIEF DESCRIPTION OF THE INVENTION

With respect to known apparatus, the operating of the process according to the invention allows a considerable improvement of the yield.

In the process according to the invention for the evaporation of liquid in thin layers, the process in which the thin layer is formed on one of the surfaces of a hollow cone pointed towards bottom and open towards the top, in rotation about its vertical axis, in a substantially cylindrical enclosure, wherein the pointed part of the said cone is immersed in a reserve of liquid to be evaporated and a communication between the external face of the said pointed part of the cone and the internal face of this cone is established so that the thin layer subjected to evaporation is formed on the internal face and on the external face of the cone. A doubling of the evaporation surface is obtained.

The invention also propses a device for operating the processes comprising a sealed enclosure having a generally cylindrical shape, of vertical axis, and at least one hollow cone pointed towards the bottom and open towards the top, driven in rotation about its axis, which is also that of the enclosure, the bottom of this enclosure providing a basin for a reserve of liquid to be evaporated wherein the pointed part of the said cone, that is solid, is immersed in the liquid reserve filling the said basin up to a level maintained constant by appropriate means and wherein at least one communication channel opening below the said level, in the external face of this pointed part, through crosses this latter and issues in the internal space of the cone, thus establishing the communication between an external face of the pointed part of the cone and the internal face of this cone, the evacuation means of the vapors being provided in the upper part of the enclosure, whereas feed means of the liquid to be evaporated are provided in the bottom part of the enclosure.

Each communication channel presents a rising path between its opening in the external face of the cone and its outlet towards the internal face, this path being furthermore oriented in such a way that, during rotation of the cone, the opening of the channel precedes the outlet of this channel in the passage of this opening, then this outlet by any fixed radial plane.

The device is applied to the construction of a "flash" distillation or especially rectification installation, as will be shown hereinunder.

DESCRIPTION OF THE INVENTION

The characteristics and advantages of the invention will be better understood from the following description, given solely by way of example with reference to the annexed drawings in which.

Figure 1:
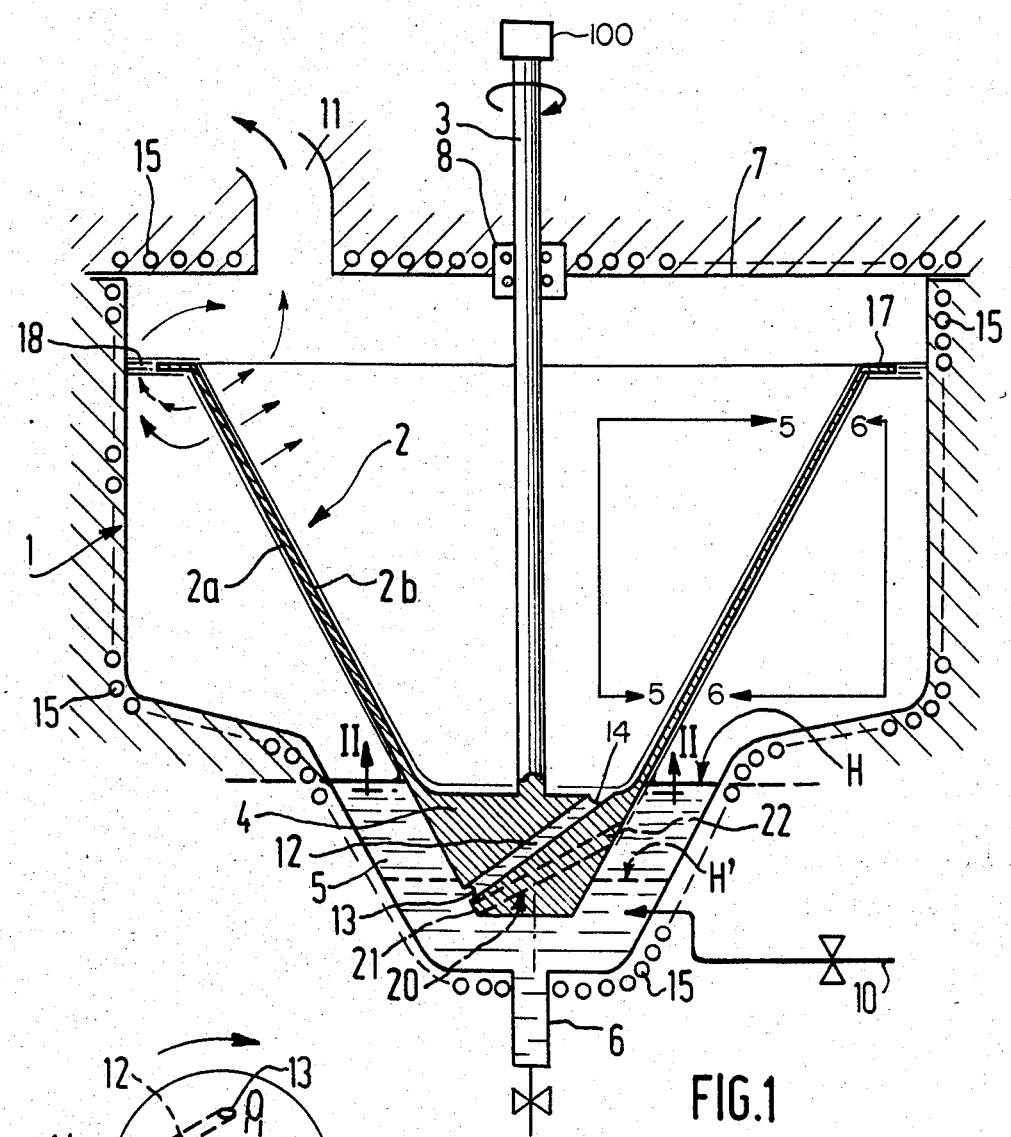
FIG. 1 is a schematic view, in section, of an embodiment of the evaporation device according to the invention, comprising a single cone, and adapted, for example, to a "flash distillation", with an isotherm enclosure.

In the embodiment selected and represented in FIG. 1, the device according to the invention comprises in an enclosure 1 of a generally cylindrical shape, a hollow cone 2 open towards the top and engaged in rotation by means about a shaft 3 having a vertical axis.

On its lower part, the enclosure 1 provides about the pointed part 4 of the cone, that can be truncated and which is solid, a liquid receiving basin at the bottom of which leaves a drawing off channel 6.

Means, not represented here, are provided to ensure in the basin 5, the maintenance of the liquid collected at a constant level H. A cover 7 sealingly closes at its upper part the enclosure 1, through crossed by shaft 3, due to a sealing bearing 8. A motor 100 is connected with and rotates shaft 3.

A feed pipe 10 for liquid to be evaporated issues into the basin 5 of the enclosure 1 towards the bottom of said enclosure.

In the cover 7 opens a vapor evacuation pipe 11, issuing into condensation means (not represented).

Due to a good thermal insulation and heating pipes 15 through crossed by a thermal regulation liquid, the enclosure 1, closed by the cover 7 is maintained at a selected constant temperature.

Figure 2:
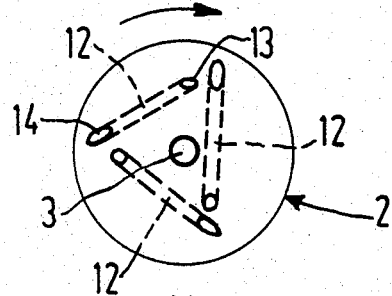
FIG. 2 is a section along line II—II of FIG. 1.

According to one characteristic of the invention, at least one communication channel 12 (three in the example as shown in FIG. 2), provided slant-wise in the pointed part 4, contacts the external face of the cone with the internal part of it; this channel 12 opens into 13 on the external face 2a of the cone above the level H in the basin 5 and rises according to a rectilinear or concave run in the solid lower part 4 of the cone to issue into 14 in the internal space of the cone, above point H, opposite the internal face 2b of the cone.

At its upper part, the wall of the cone is completed by a flange 17 radially directed towards the exterior. The rotation speed of the cone about its axis must be sufficient for the centrifugal force above level H to be greater than the forces of gravity, of viscosity and of surface tension exerted on the liquid.

As to the sense of rotation, it is such that the liquid is, due to the orientation of channels 12, sucked inside these channels by this rotation (FIG. 2). With this aim, the low inlet 13 of the channel, passes by any fixed radial plane prior to the high outlet 14 of this same channel during rotation of the cone.

Under these conditions, two thin layers of liquid are formed, one in contact with face 2a directly in contact with the liquid contained in the basin 5, the other in contact with face 2b, by rising on the liquid by means of each channel 12 immersed in this same basin. These faces can advantageously be made rough, for example, by sand-blasting or comprise grooves 2c and 2d.

The mixture to be treated, heated to flash temperature in 10, is brought in the basin 5 which is disposed at the point of the cone. When the immersion of the point of the cone is sufficient, the rotation of the cone ensures the rise of the liquid and its spreading out in thin layers on the internal and external faces of the cone, where the evaporation occurs. The formation of thin layers from this mixture which can be, for example, a heavy crude petroleum, instantaneously provokes, on the surfaces of the cone the evaporation without boiling of the constituents of the mixture for which the temperature and absolute pressure conditions are united and maintained constant, in the evaporation enclosure 1, by appropriate means (not represented).

The vapors produced are condensed, continuously outside the evaporation enclosure by appropriate means, and stocked in a collector or eliminated continuously, by pumping by channel 11.

The non-evaporated liquid phase is centrifuged along the length of the flange 17 of the open cone 2 on the internal surface of the thermostated enclosure, in the form of a radial sheet 18, and runs down to basin 5.

It is in order to conserve the required thermal balance that it is necessary to thermostat the liquid-receiving enclosure at the flash temperature involved.

When the level of the liquid contained in the enclosure is at the maximum defined herein-below, said level is prevented from continuing to rise by a continuous drawing off in 6. The flow-rate of the drawing-off is subject to measurement of the liquid level H, which is obtained by measuring the loss of charge provoked by this liquid column. Measurement of the drawing-off flow-rate is carried out, for example, by a tachometer installed on the geared pump ensuring the maintenance of the level.

According to this operation of the process, the two faces of the cone are used and allow, on the one hand, a considerable feed flow-rate for a minimum of space required, and, on the other hand, a recirculation at extremely high flow-rate of the liquid phase thus allowing a quasitotal exhaustion in a very short operation time.

The yield of the unit is automatically adjusted, at its optimal level by the digital system that directs the piloting of the geared pumps so as to establish the maximum flow-rate, i.e. always keeping slightly below stoppage flow-rate.

In one application of the process to the dehydration of heavy crude petroleum, containing 15% of water a material having the following characteristics is used:

| | |
|---|---|
| cone having an angle of | 60° at its apex |
| total height of the cone | 245 mm |
| height of solid cone | 40 mm |
| diameter of the 3 channels 13 | 6 mm |
| opening diameter | 250 mm |
| thickness of the wall | 2 mm |
| rotation speed | 450 tr/mn | enclosure maintained at 150° C. with a pre-heating at 80°–95° C. of the treated mass.

In this example, the feed flow-rate was about 15 l/h.

The retention volume, maintained in the basin 5 was about 150 ml.

The cone was sunked about 40 mn in the liquid, a depth sufficient to produce the driving effect required.

It is interesting to note that the vapors issuing from the external face of the cone must, in order to be evacuated, cross through the radial sheet 18 that favors the gas-liquid separation with an enrichment of the residual liquid.

The device of FIG. 1 can be the object of a variation.

Beside channels 12, communicating the outside of the cone 2 with the inside space of the cone, is provided at least one slanted light, disposed, for example, below a channel 12, crossing through the solid pointed part 4 of the cone with the same orientation conditions as channels 12 with respect to the sense of rotation of the cone for the low inlet 21 and the high outlet 22 of this light, above point H.

The drawn-off liquid in 21 is pumped by the light 20 and brought onto the external face 2a of the cone.

It is thus possible to obtain a satisfactory operation of the device by lowering the level H of the liquid in the basin 5 to a lower level H' contingent on the inlet-apertures 13 and 21 in channels 12 and lights 20 are below this level Hp' and also that the centrifugal force exerted at the level of 22 on the liquid layer of the wall 2a is superior to the viscosity, gravity and surface tension forces.

In order to maintain the level constant between H and H', ensuring a hydraulic protection, any suitable means may be used: syphon, control adjustment actuated, for example, by determination of the feed flow-rate and the drawing-off flow-rate and action on the flow-rate of the feed and drawing-off pumps.

In the device according to the invention, settling time of the treated water on the evaporation surface is increased, which is equivalent to a multi-passage with its advantages.

Furthermore, the volume of the fed phase with respect to the volume circulating is low and thus the incidence on the cooling installation due to the expansion is reduced.

The gaseous phase by load is increased, while the energetic consumption is reduced.

It is, of course, possible to dispose on a single turning shaft of a single enclosure, several cone devices according to the invention in order to constitute installations ensuring the greatest possible flow-rates, and thus allowing to avoid the realization, which is delicate, of large-size diameter cones, which require much space.

Figure 3:
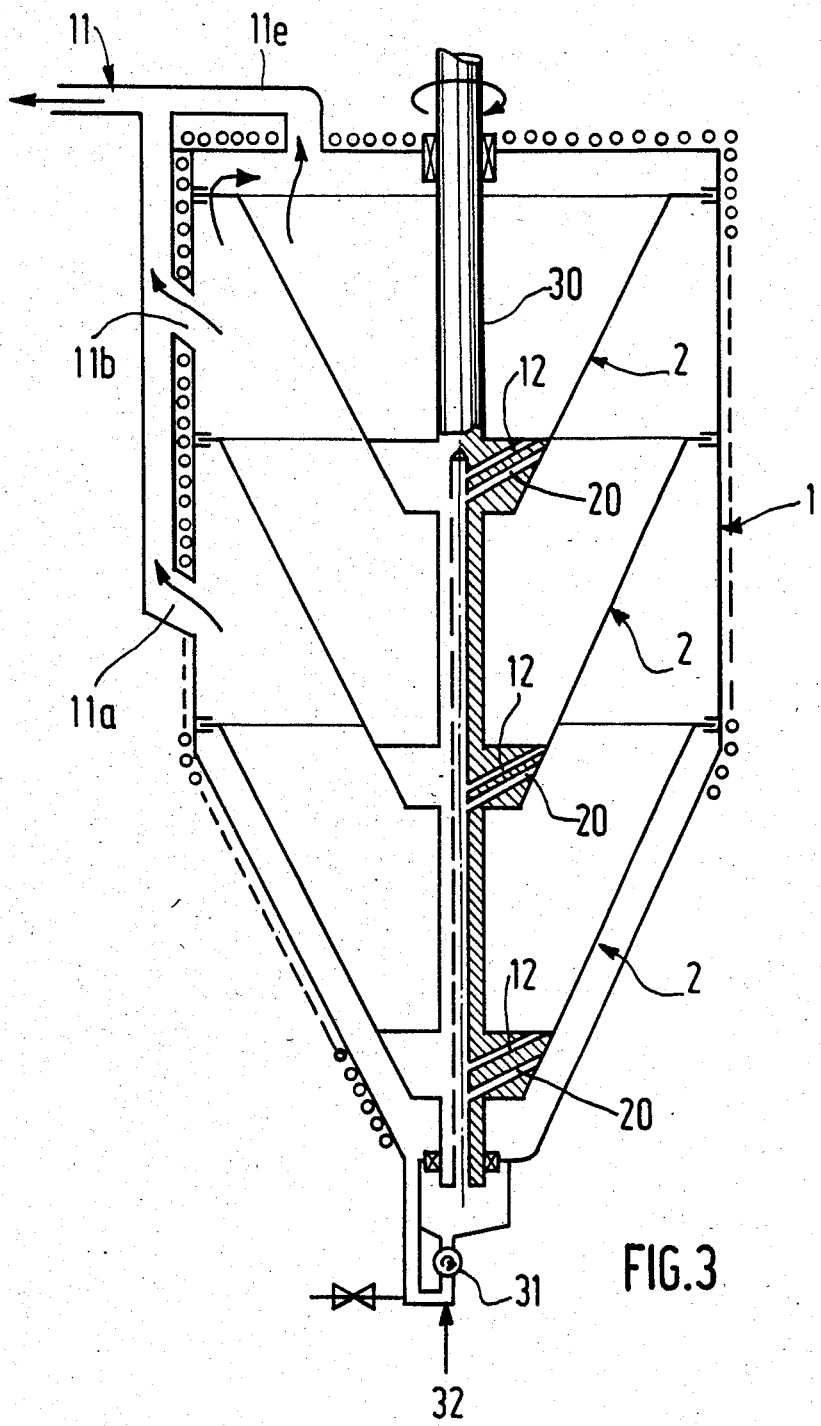
FIG. 3 is a schematic view of a flash distillation installation according to the invention comprising three cones identical to that of FIG. 1, comprising an isotherm enclosure.

As shown in FIG 3, it is possible to superimpose several cones, for example three, fed in parallel. The feed on the two faces of the cones is carried out with the use of a hollow shaft 30, from which leave towards the faces of the cones, channels 12 and lights 20, as previously described. The recirculation of the liquid is carried out in a hollow shaft 30 by means of a pump 31, fed in 32 by a heated load, at a pressure such that the loss of charge due to the height of the liquid (length of the hollow part of the shaft) is negligible.

The vapors produced are led by blast-pipes 11a, 11b, 11c, 11e, at each stage of the cone, towards a condensor (not represented).

The cone device according to the invention can also be used advantageously for cracking units in rectification and in exhaustion.

Figure 4:
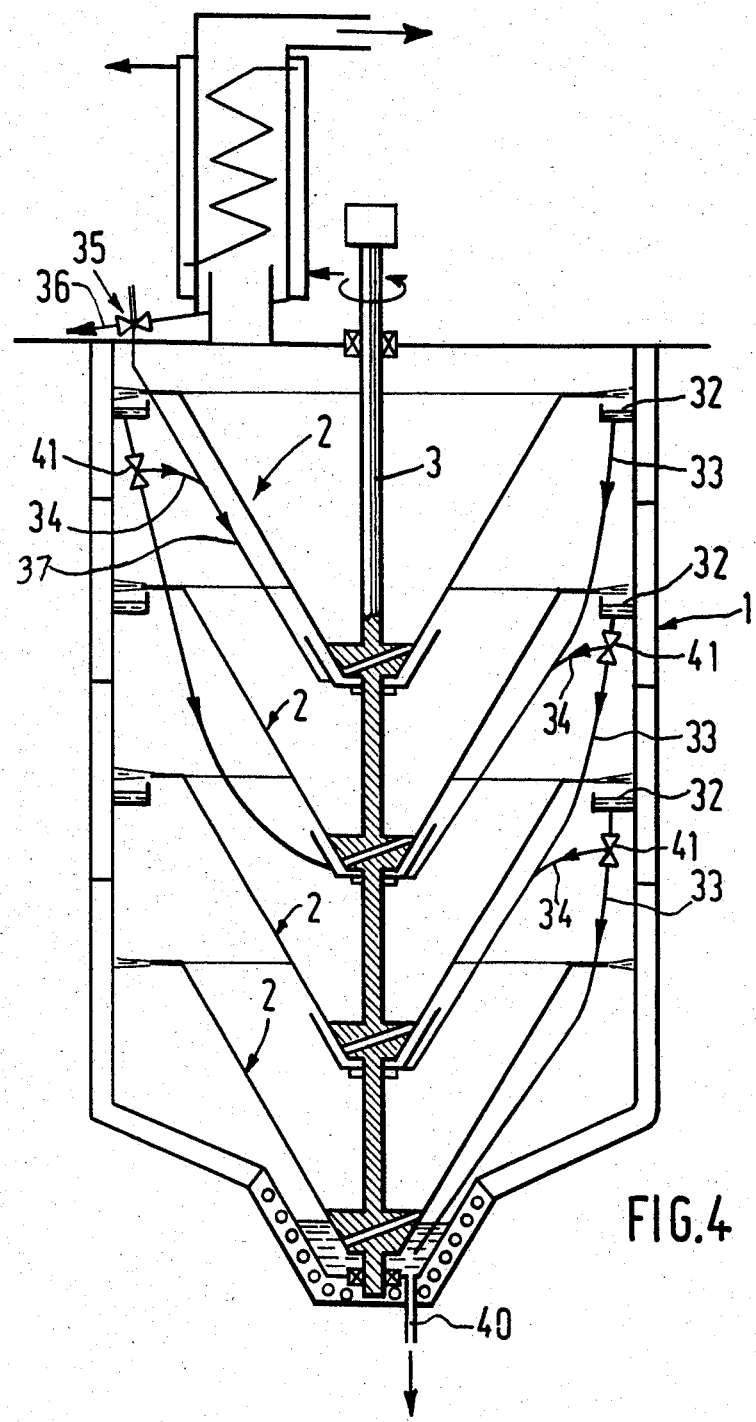
FIG. 4 is a schematic view of a cracked distillation installation, with a lagged enclosure.
Figure 5:
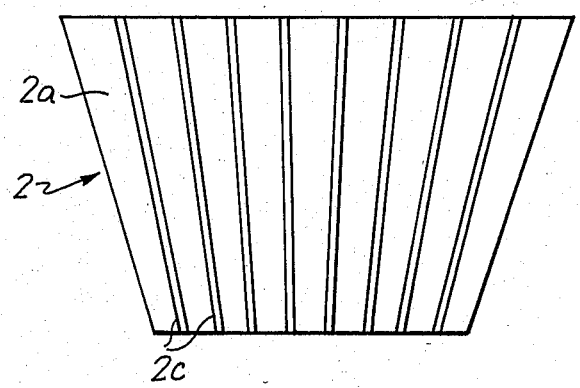
FIG. 5 is a plan view of a portion of the inner surface of the cone of FIG. 1, viewed from lines 5—5 thereof.
Figure 6:
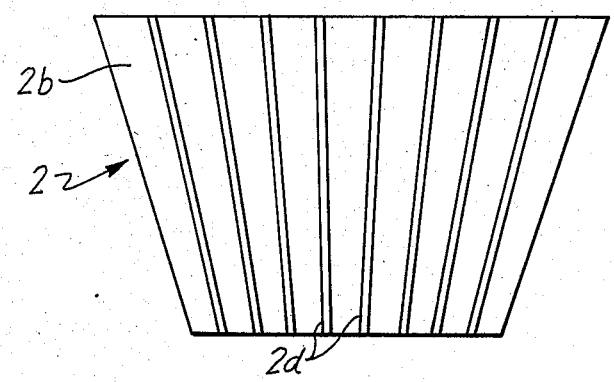
FIG. 6 is a plan view of a portion of the external surface of the cone of FIG. 1, viewed from lines 6—6 thereof.

It involves replacing the hole, blister and valve plates or any other system of plates, by stages of turning cones (FIG. 4) four in this example, but there can, of course, be more.

The evaporation occurs on each face of the cone in thin layer, the heat and material (liquid-gas) exhange occurs on the "mist" formed at the open periphery of the cone, between the moment where the liquid is ejected from the cone and the moment where it enters into contact with the wall of the enclosure 1, this wall being lagged. The vapors produced on the directly lower cone come into contact with the outside film of the upper cone by forming an exchange by licking, then will create a second exchange of the same nature with the above-mentioned mist.

The liquid recovered on the wall of the enclosure is disposed in recovery spouts 32 after exchange with the gas is, for one part, recycled on this plate by the channel or conduit 34 (valve 41) and, for the other part, sent through pipeline 33 to the base of the directly lower cone in order to be distributed two thin layers on the external and internal faces of the cone, through distributing channels and lights having tangential perforations and undergoes an evaporation corresponding to the new temperature and pressure conditions prevailing on the lower cone. An increasing concentration gradient, in the most volatile products thus exists between the foot and the head of the cracked distillation column thus created.

This concentration gradient is not however accompanied, as in classic real plate columns, by a loss of charge as important as in said column. Indeed, the loss of charge of the dry column is practically nil; the loss of charge is only created by the difference of vapor density of the different products present in the column. The height of the liquid that must overcome the vapors is itself also very reduced since it concerns a liquid "mist", the thickness of which is always small.

The vapors produced by the cone at the "top" of the column are totally condensed and are, according to the rate of reflux imposed by operating of the unit, due to a reflux divider 35, in part collected as distillate in top in 36, and for another part reinjected in 37 under the top cone.

The "bottom" cone functions as a reboiler of the bottom of the column, as a simple exhaustion monocone (as described herein-above, the residue being evacuated in 40).

This system allow either unbroken operation or operation in batch. Furthermore, channels or conduit 34 can be provided, adapted to ensure a recycling of the liquid phase (the rate of which is adjusted by valves 41) on each plate and thus to increase the quality of cracking.

The process according to the invention allows, furthermore, to carry out cracking under widely various pressures, while leading to clear advantages over the known processes operating under reduced pressure.

Of course, the present invention is in no way limited to the embodiments described and represented and it can be adapted to numerous variants available to the man skilled in the art, without departing from the scope and spirit of the invention.

We claim:

1. A thin layer evaporation device comprised of, in combination, a sealed enclosure having a cylindrical shape, a vertical axis, at least one hollow cone contained within said enclosure and having the pointed portion in said vertical axis and extending towards the bottom of said enclosure, said cone having at least one channel communicating with the internal and external surfaces of said cone and disposed in said cone so as to provide a rising path between the opening in the external surface of said cone and the outlet in the internal surface of said cone, means for rotating said cone about said vertical axis, means for providing feed liquid to said enclosure and means for evaporating and evacuating vapors from said feed liquid.

2. The device according to claim 1, having three channels and wherein each channel provides a rising path between the opening in the external face of the cone and the outlet in the internal face.

3. The device according to claim 1, wherein at least one additional channel is provided in the pointed portion of said cone so as to establish a further communication between the zone of the external surface of the cone located below the level of said liquid in the enclosure and a zone of that same external surface, above the level of said liquid.

4. The device according to claim 1, wherein the upper edge of said cone comprises a radial flange, directed towards the outside of said cone, in the direction of the wall of the enclosure.

5. The device according to claim 1, wherein the faces of said cone contain grooves.

6. The device according to claim 1, wherein additional heating means is provided on the walls of said enclosure.

7. The device of claim 1, containing a plurality of cones superimposed on a single hollow shaft, means whereby the hollow portion of said shaft communicates with said channels, means being provided for feeding liquid under pressure to said hollow portion, and vapor evacuation means being provided in the wall of the enclosure above each of said cones.

8. The device of claim 1, containing a plurality of cones superimposed on a single shaft, the pointed portion of each of said cones being disposed in a liquid receiving basin contained in said enclosure, and the upper edge of each of said cones with the exception of the lower cone, communicating with recovery spouts disposed on the wall of said enclosure, conduits connecting each of said spouts associated with a cone to the basin of said lower cone, and a reflux separator placed at the top of said device for feeding a liquid fraction to the basin of the upper cone.

9. A process for thin layer evaporation of liquids which comprises introducing said liquids into a thin layer evaporation device comprised of at least one hollow cone contained in a cylindrical sealed enclosure wherein the pointed portion of said cone is in the vertical axis of said cylindrical enclosure and extends toward the bottom of said enclosure, said cone having at least one channel communicating with the internal and external surfaces of said cone and disposed in said cone so as to provide a rising path between the opening in the external surface of said cone and the outlet in the internal surface of said cone, and rotating said cone about its vertical axis, wherein the pointed part of the said cone is immersed in said liquid to be evaporated and a communication is established between the external part of the said pointed part of the cone and the internal face of this cone, so that a thin layer of said liquid is formed on the internal face and on the external face of said cone and evaporating vapors from said liquid.

* * * * *